United States Patent [19]

Frederick

[11] 4,072,128

[45] Feb. 7, 1978

[54] LIQUID APPLYING DEVICE

[75] Inventor: Warren Phillip Frederick, McHenry, Ill.

[73] Assignee: Baxter Travenol Laboratories, Inc., Deerfield, Ill.

[21] Appl. No.: 652,914

[22] Filed: Jan. 28, 1976

[51] Int. Cl.² .............................................. B05C 7/00
[52] U.S. Cl. ....................................... 118/3; 118/408
[58] Field of Search ....................... 118/3, 404, 8, 408; 156/69, 293

[56] References Cited

U.S. PATENT DOCUMENTS

| | | | |
|---|---|---|---|
| 1,361,007 | 12/1920 | Brown | 118/3 |
| 1,384,048 | 7/1921 | Coates | 118/408 X |
| 1,889,911 | 12/1932 | Storck | 118/401 |
| 3,190,260 | 6/1965 | Merker | 118/3 |
| 3,851,617 | 12/1974 | Usab | 118/3 |
| 3,889,628 | 6/1975 | Usab | 118/3 |

*Primary Examiner*—John P. McIntosh
*Attorney, Agent, or Firm*—Henry W. Collins; Paul C. Flattery; Richard G. Kinney

[57] ABSTRACT

The device comprises a body member having a liquid reservoir therein, a manually operable pump in communication with the reservoir, and an applicator post mounted on the pump. A metered amount of liquid is applied to the inner surface of a portion of a tubular member by manually placing the tubular member portion over the applicator post and then pressing inwardly of the device.

5 Claims, 4 Drawing Figures

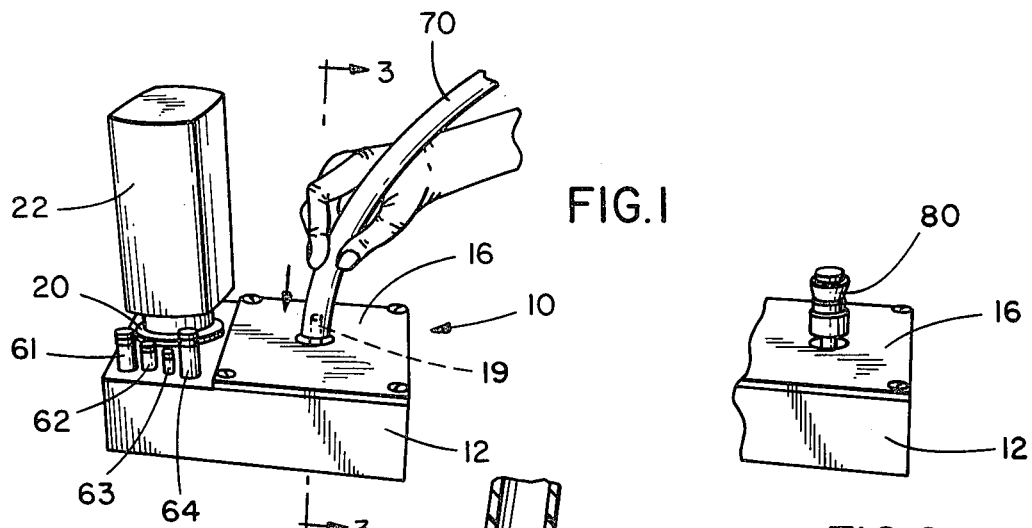
FIG. 1
FIG. 2
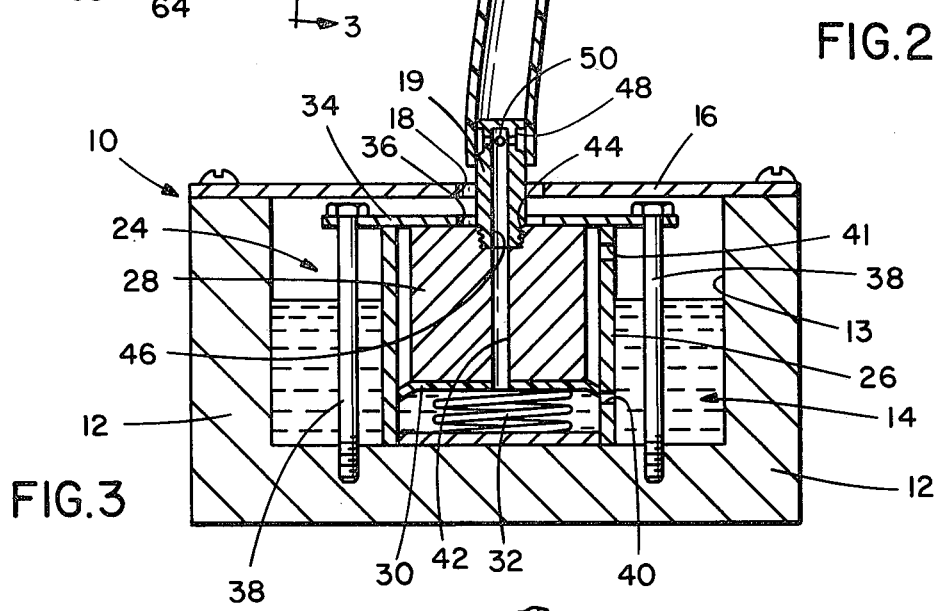
FIG. 3
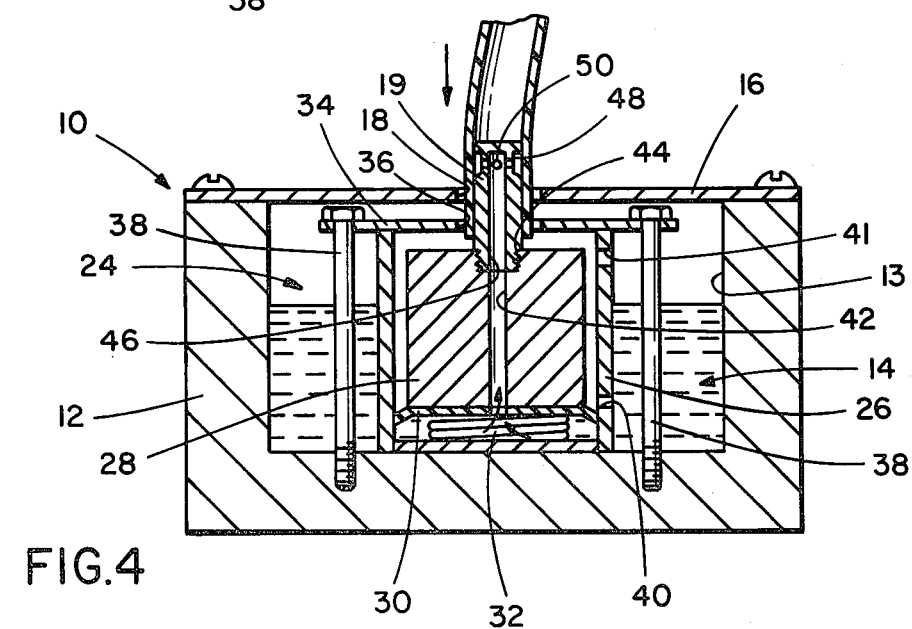
FIG. 4

LIQUID APPLYING DEVICE

BACKGROUND OF THE INVENTION

1. Field of the Invention

The field of the invention is methods and devices for applying a cement or a solvent to one or the other of two mating tubular members prior to and for the purpose of bonding the members together.

2. Description of the Prior art

Various methods and devices have been proposed for applying a cement or a solvent to the interior or exterior surface of a portion of a tubular member prior to joining the tubular member with a mating tubular member.

For example, in U.S. Pat. Nos. 3,498,866 and 3,523,852, apparatus for applying cement to the exterior surface of a tubular member are disclosed. Also a method for solvent sealing plastic seams is disclosed in U.S. Pat. No. 3,821,047, and a method for solvent welding plastic pipe joints is disclosed in U.S. Pat. No. 3,765,983.

In solvent bonding or welding only a small amount of solvent is needed to soften and dissolve or "melt" the surface area to be bonded. Accordingly, and as will be explained in detail hereinafter, the device of the present invention provides a pumping mechanism which is manually operated and spring biased for dispensing a metered amount of solvent. Heretofore manually operated, spring biased dispensers for dispensing a metered amount of a liquid have been proposed. See, for example the dispenser disclosed in U.S. Pat. Nos. 2,756,905 and 3,078,471.

However, heretofore, a manually operated device including an applicator post for supplying a metered amount of solvent to the interior surface of a portion of a tubular member to be bonded to a mating tubular member has not been proposed.

SUMMARY OF THE INVENTION

According to the invention there is provided a device for applying liquid solvent to the interior surface of the end portion of a plastic tubing of constant interior diameter, said device comprising a reservoir, at least one applicator post sized to receive the tubing in a close sleeve fit and supported above said reservoir, and means which are associated with said reservoir, which mount said applicator post and which are manually operable, when the tubular member portion is placed in a sleeve fit on said post and the tubing and post is moved inwardly of said device and the tubing is removed from the post, for applying liquid to the interior surface of the constant interior diameter of the tubing.

BRIEF DESCRIPTION OF THE DRAWINGS

FIG. 1 is a perspective view of the liquid applying device of the present invention with the end of a plastic tubing inserted over the applicator post of the device.

FIG. 2 is a fragmentary perspective view of a portion of the device shown in FIG. 1 and shows a plastic connector mounted on an applicator post of the device.

FIG. 3 is a vertical sectional view taken along line 3—3 of FIG. 1 and shows the reservoir and pumping mechanism within the liquid applying device.

FIG. 4 is a sectional view similar to FIG. 3 but shows the pumping mechanism depressed after the end of a piece of plastic tubing has been inserted over the applicator post and the tubing and applicator post have been pushed inwardly of the device.

DESCRIPTION OF THE PREFERRED EMBODIMENT

Referring to FIG. 1, the liquid applying device of the present invention is generally identified by reference numeral 10 and includes a generally rectangular, or box-shaped, body member 12. As shown in FIG. 3, the body member 12 has a cavity 13 therein which forms a reservoir 14 for receiving a solvent. The cavity 13 is covered by a cover plate 16 except for a central aperture 18 therein through which an applicator post 19 extends. On the upper surface of the body member 12 adjacent the cavity 13 is a generally cylindrical opening surrounded by an annular shoulder 20 for mounting a container 22. Typically, the container 22 is a glass bottle which is mounted in an inverted manner on the body member 12 as shown in FIG. 1. The bottle 22 forms a source of solvent which is supplied to the reservoir 14 through a passageway which extends within the body member 12 between the cylindrical opening and the cavity 13.

A pumping mechanism 24 is situated within the cavity 13 and includes a cylinder 26 which is closed off at its lower end and is supported on the bottom of the cavity 13. A plunger-forming piston 28 is loosely received within the cylinder 26 and has a diaphragm 30 mounted on the inner end thereof. A spring 32 is positioned between the diaphragm 30 and the lower end of the cylinder 26. The piston 28 is held in the cylinder 26 against the compression of the spring 32 by a stop plate 34 which has a central aperture 36 therein, which is positioned above the cylinder 26 and which is fixed to the body member 12 by means of bolts 38. The cylinder 26 has a hole 40 therein located a predetermined distance above the lower end of the cylinder 26 and a vent 41 located near the upper end of the cylinder 26. The hole 40 provides a passageway for solvent to flow from the reservoir 14 into the cylinder 26.

The piston 28 has a central bore or passageway 42 therethrough which is in communication through a hole in the diaphragm 30 with the solvent in the cylinder 26. The upper end of the bore 42 is countersunk and threaded as indicated at 44 for mounting the applicator post 19.

As shown, the applicator post has the bore 46 which extends into the post 19 from the threaded end thereof and which terminates adjacent an upper, closed end of the post 19. An annular groove 48 is provided on the outer periphery of the post 19 adjacent the closed end thereof and four lateral passageways 50 are provided in the post 19 between the bore 46 and the annular groove 48.

Preferably, the body member 12 of the liquid applying device 10 includes a plurality of small cavities on the upper surface thereof for storing a plurality of applicator post 61–64 all of which have a threaded lower end for mounting the same in the countersunk threaded portion 44 of bore 42. The small cavities may be threaded and the applicator posts 19 and 61–64 each have a different cross section for being received within a different sized tubular member.

In operation of the liquid applying device 10, a bottle 22 of solvent is first mounted in the cylindrical opening so that solvent fills the reservoir 14 to a level determined by the position of the inverted rim of the bottle 22 in the body member 12. The device 10 is then ready for use.

An operator will now mount a desired applicator post 19, 61, 62, 63, or 64, e.g., post 19, on the piston 28. Next, the operator will manually grip a piece of plastic tubing 70 adjacent an end portion 72 thereof and press the end portion 72 over the post 19 as shown in FIGS. 1 and 2 and then inwardly, i.e., downwardly, against the piston 28. As the piston 28 is pushed downwardly, the hole 40 in cylinder 26 is closed by the diaphragm 30 causing solvent to flow upwardly through the passageway 42, bore 46 and holes 50 to the annular groove 48. The solvent will then contact and "wet" the inner surface of the end portion 72. The piston 28 will be pushed downwardly until the spring 32 is fully compressed as shown in FIG. 4. It will be understood that a metered amount of solvent is supplied to the applicator post 19 and this metered amount is determined by the volume displaced by the piston 28 when it moves from a first position just closing the hole 40 in cylinder 26 (essentially the position of piston 28 shown in FIG. 3) to a second position where the spring 32 is compressed (the position of piston 28 shown in FIG. 4). The metered amount chosen is just enough to "wet" the inner surface of a tubular end portion with little excess. If there is any excess solvent, such excess will flow downwardly along the periphery of the post 19 into the cavity 13 and out of contact with the tubing 72 or the operator's hand.

Also, it will be understood that substantially the entire inner surface of the end portion 72 is "wetted" with solvent from the annular groove 48 as the plastic tubing 70 is pulled off of the applicator post 19, as a result of which the inner surface is made tacky for bonding to a mating tubular member. Although described in steps above, the application of solvent to the inner surface of the end portion 72 is usually accomplished manually, i.e., by hand, with a substantially continuous "in-out" motion of the tubing end portion 72 over the applicator post 19. Moreover, the tubular member can be a plastic connector 80 as shown in FIG. 2 instead of a plastic tubing.

From the foregoing description, it will be apparent that the liquid applying device 10 of present invention provides a simple, efficient and "clean" device for applying a liquid, such as a solvent, to the inner surface of tubular member, preferably in the process of "welding" the tubular member to a mating tubular member. Accordingly, the device of the present invention provides a number of advantages, some of which have been described above and others of which are inherent in the invention.

Additionally, it will be readily apparent that obvious modifications and variations can be made to the device 10 without departing from the spirit or scope of the invention. Accordingly, the scope of the invention is only to be limited as necessitated by the accompanying claims.

I claim:

1. Device for applying liquid solvent to the interior surface of the end portion of a piece of plastic tubing of constant interior diameter, said device comprising a reservoir, at least one applicator post sized to receive the tubing end portion in a close sleeve fit and supported above said reservoir, and means which are associated with said reservoir, which mount said applicator post and which are manually operable, when the tubing end portion is first placed in a sleeve fit on said post, the tubing and post are moved inwardly of said device and then the tubing end portion is removed from the post, for applying liquid to the interior surface of the constant interior diameter of the tubing end portion, said applicator post having a generally axially extending bore extending into said post from one end thereof, but not through said post, having an annular groove on the periphery thereof adjacent the other end of said post and having at least one passageway between said generally axially extending bore and said annular groove, and said liquid applying means including pump means which, when pressed inwardly of said device, supplies a metered amount of liquid to said applicator post, said pump means comprising a cylinder having one end which is closed off and which is positioned in the liquid solvent in said reservoir, said cylinder having a hole therein spaced a predetermined distance from said closed end, but below the level of liquid solvent in said reservoir, a piston in said cylinder having an axially extending passageway therethrough and means for mounting said applicator post on the outer end thereof with the axially extending passageway in said post being in communication with said passageway in said piston, spring means in said cylinder between said inner end of said piston and said closed end of said cylinder for biasing said piston outwardly of said cylinder, and stop means fixed in a position adjacent to and in engagement with the outer end of said piston to limit outward movement of said piston, the metered amount of liquid being substantially equal to the volume in said cylinder between a first position of said piston where it closes off said hole and bears against said stop means and a second position of said piston where it is pushed into said cylinder and compresses said spring means.

2. The device according to claim 1 wherein said applicator post is removably mounted on said liquid applying means and wherein said device includes a plurality of applicator posts all of which have the same mounting means but wherein each post has a different cross section for being received within a different sized tubular member, and each of which may be substituted for the other on the device without disassembling any other part of the device.

3. The device according to claim 1 wherein said upper end of said piston has a threaded bore therein for mounting said applicator post, said bore being in communication with said passageway in said piston.

4. The device according to claim 1 including a body member having said reservoir formed therein, means for mounting a liquid container which has an opening at the top thereof in an inverted position on said body member and passage means in said body member beneath said mounting means and in communication with said reservoir.

5. The device according to claim 4 wherein said applicator post is removably mounted on said liquid applying means, said device further comprises a plurality of different sized applicator posts, and said body member has means for storing said posts thereon.

* * * * *